Figure 1:
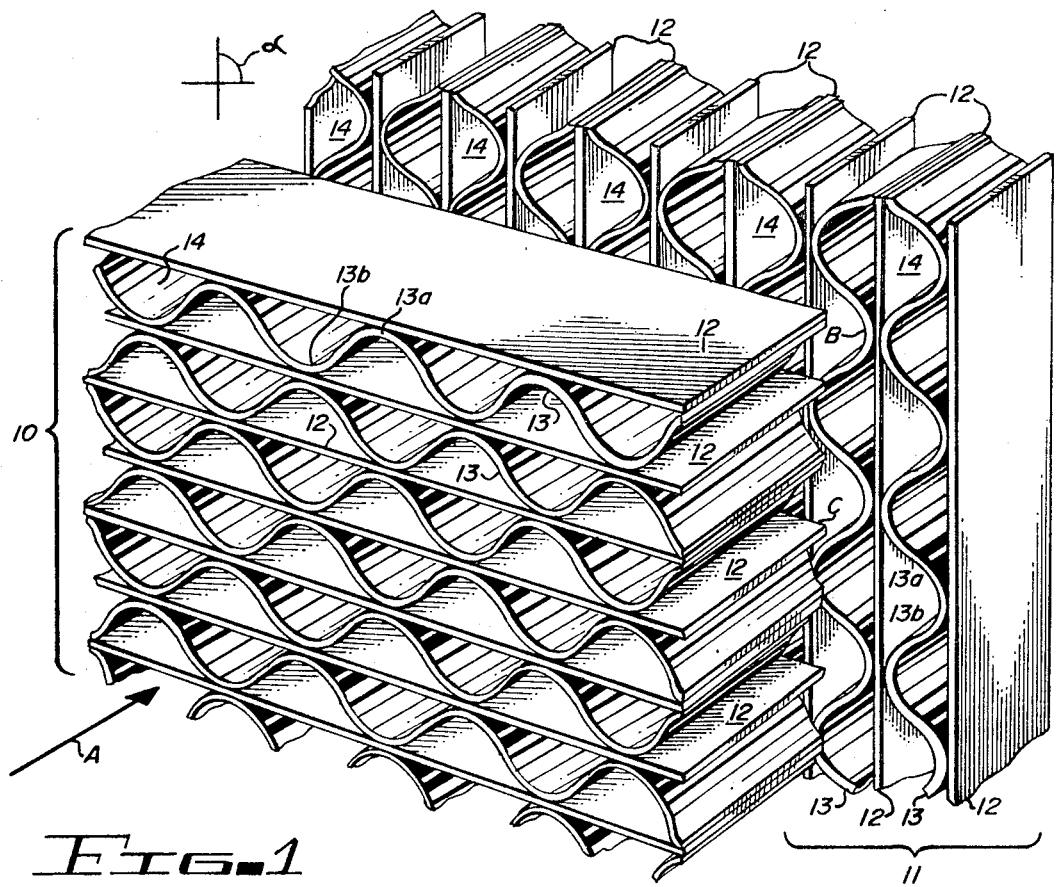

United States Patent [19]
Feldman

[11] 3,727,384
[45] Apr. 17, 1973

[54] CONTACT ELEMENT

[76] Inventor: Elliot I. Feldman, 2850 E. Second Street, Tucson, Ariz. 85716

[22] Filed: Apr. 24, 1972

[21] Appl. No.: 246,947

[52] U.S. Cl. ..................... 55/484, 55/316, 55/387, 55/489, 55/512
[51] Int. Cl. ............................................. B01d 50/00
[58] Field of Search ..................... 55/316, 387–389, 55/490, 512, 489, 484

[56] References Cited

UNITED STATES PATENTS

| 3,172,747 | 3/1965 | Nodolf | 55/316 |
| 3,568,416 | 3/1971 | Staunton | 55/316 |
| 3,630,007 | 12/1971 | Neumann | 55/387 |
| 3,664,095 | 5/1972 | Asken | 55/387 |

FOREIGN PATENTS OR APPLICATIONS

| 1,225,751 | 3/1971 | Great Britain | 55/316 |

Primary Examiner—Bernard Nozick
Attorney—William H. Drummond

[57] ABSTRACT

A reactant element for contacting a stream of fluid such as air or other gas or liquid with a particulate reactant. The particulate reaction is retained in a core structure specially constructed to resist deflection by fluid moving through the element. The core structure consists of two sets of parallel stiffening strips transversely disposed across a moving fluid stream. One of the sets of parallel strips is rotationally displaced from the other such that the strips of one set lie in planes angularly displaced from the planes of the first set of strips. Corrugated spacer sheets are disposed between the strips of each set and are joined at the tops and bottoms of the corrugations to the next-adjacent strips. A particulate reactant material is disposed in the fluid channels formed by the spacer sheets and the stiffening strips. A frame encloses the periphery of the core structure, forming a unitary cartridge-like element.

1 Claim, 2 Drawing Figures

PATENTED APR 17 1973 3,727,384

CONTACT ELEMENT

This invention relates to apparatus for treating air or other fluids, either gases or liquids and, more particularly, relates to reactant elements of the general type disclosed in my issued U.S. Pat. No. 3,577,710, issued May 4, 1971.

In one aspect, the invention relates to apparatus specially adapted for contacting the fluid with a particulate reactant material, especially air or other gaseous fluids.

In yet another aspect, the invention relates to fluid-treatment reactant elements having improved resistance to deflection by fluid flowing therethrough.

In another respect, the invention relates to improved apparatus for subjecting air to a wide variety of unit operations in which it is necessary to contact air with a particulate reactant such as deodorization, purification, dessication, filtration, and the like.

For convenience, my present invention and the various embodiments thereof will be described below with reference to the treatment of air by contact with solid particulate reactants. However, it will be apparent to those skilled in the art that the reactant elements which I described can be employed in any application in which it is necessary to contact a fluid, either liquid or other gas, with solid particulate reactants, catalysts, reaction substrates, etc.

In many unit operations, it is necessary to obtain intimate contact between air and one or more solid reactant materials to produce various changes in the physical or chemical condition of the air. For example, air is frequently subjected to dehumidification, absorption, filtration, adsorption, sublimation and deodorizing operations by passing an airstream through or otherwise intimately contacting the air mass with a solid material which may be porous or particulate. In the case of particulate solids, the contact may be accomplished by passing the air through a loosely packed stationary bed of the reactant, by mixing the air with finely divided particulate material which is later removed from the air by filtration, by the familiar fluidized bed technique, and by various other art-recognized expedients.

In my U.S. Pat. No. 3,577,710, I describe a reactant element useful for contacting air, gas and other fluids with particulate reactant materials to produce a wide variety of chemical or physical changes of the fluid. Illustratively, the reactant element described in my previous patent is useful in deodorizing, disinfecting or detoxifying air, for carrying out various chemical reactions between the air, gas or other fluid and solid reactant materials, and in conducting vapor phase reactions between two or more compounds prepared in situ by passing an appropriate carrier fluid over two or more particulate reactants.

I have now discovered and developed an improved reactant element of the type generally contemplated and disclosed in my prior patent in which the element is constructed in such manner as to minimize deflection of the reactant element by fluid flowing therethrough, enabling one to employ lighter and thinner materials in constructing the element.

As used herein, the term "reactant" includes not only materials which actually react with the components of an airstream but also, in a broader sense, includes materials which do not chemically react with the components of the airstream but which act upon the stream to alter its overall chemical or physical characteristics. Thus, by way of illustration, and without limiting the generality of the term, the work "reactant" includes such diverse air-treatment materials as dessicants, absorbents and adsorbents such as silica gel, alumina and charcoal; sublimatory treating agents such as mothproofing agents, odor-masking or perfuming agents, as well as actual chemically reactive materials such as oxidative deodorizers or catalytic purifying agents. Also, as will be apparent to those skilled in the art, the term "reactant" when used in connection with the present invention, also includes active chemical agents adsorbed on or absorbed in solid particulate substrates and filter media.

In structures embodying the present invention, the reactant is formed in discrete granules, pellets, beads or any other suitable discrete particulate shape such that they may be positioned within the channels of the sheet means in such a way as to provide acceptable contact with the airstream moving therethrough and yet provide sufficient free area to induce minimum pressure loss. Obviously, the particle size of the reactant must not be so small that it is physically entrained in the moving airstream, or so small that the reactant moves within the channel, forming a compact mass blocking the airflow. Selection of the proper granule or particle size can be accomplished by routine experimentation having regard for this disclosure and, since the proper particle size will depend upon allowable pressure drop, degree of contact required, net space velocity of the airflow, density of the granule, etc., it is impossible to place numerical limitations on the range of particle sizes which may be employed in all applications of the invention.

It is a primary object of the invention to provide a reactant element useful in contacting fluids with a particulate reactant.

Yet another object of the invention is to provide a reactant element specially designed to reduce deflection of the element by fluid flowing therethrough.

Still another object of the invention is to provide a means of constructing a reactant element in which thinner and lighter materials of construction can be employed.

Figure 2:
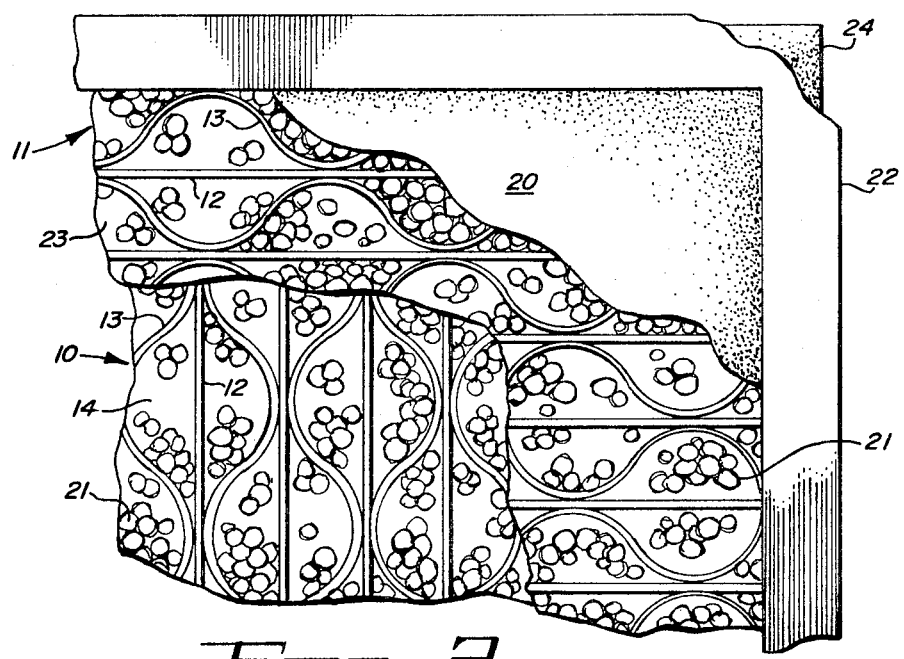

These and other objects and advantages of the invention will be apparent to those skilled in the art from the following detailed description of the invention taken in conjunction with the drawings, in which:

FIG. 1 is an exploded perspective view of the core construction of a reactant element, constituting a presently preferred embodiment of the invention; and FIG. 2 is a cutaway plan view of a reactant element having a core constructed as in FIG. 1.

Briefly, in accordance with my invention, I provide an improved reactant element for use in fluid-treatment apparatus. Typically, such apparatus includes a fluid duct member having upstream and downstream portions, means for moving fluid from the upstream to the downstream portion of the duct and a reactant element disposed transversely across the duct between the upstream and downstream portions for contacting the moving fluid with a particulate reactant. The element comprises a first core member and a second core member. The first core member includes a plurality of transverse planar stiffening strips disposed in planes generally parallel to the direction of fluid flow through the reactant element and corrugated spacer sheets disposed between and joined at the tops and bottoms of the corrugations thereof to the next-adjacent stiffening strips. The spacer sheets and stiffening strips together form a plurality of parallel fluid channels extending generally in the direction of fluid flow through the reactant element. The second core member is constructed in the same manner as the first core member and is disposed in parallel relation to the first core member. The second core member is rotationally displaced from the first such that the stiffening strips of the second core member lie in planes rotationally angularly displaced from the planes of the stiffening strips in the first core member. The particulate reactant is disposed in the fluid channels and a frame optionally encloses the periphery of the core members, forming a unitary cartridge-like element therewith. The core members are preferably disposed in direct face-to-face contact (as shown in FIG. 2) such that they directly support each other against fluid deflection loads. However, if desired, the core members can be spaced apart by a suitable load-transmitting porous member, such that fluid deflection loads are transmitted from one to the other.

Turning now to the drawings, FIG. 1 is an exploded perspective view illustrating the general placement of core members to form a reactant element embodying the invention. The first core member, generally indicated by reference character 10, and the second core member, generally indicated by reference character 11, each consist of a plurality of planar stiffening strips 12. The stiffening strips lie in planes generally parallel to the direction (indicated by arrow A) of fluid flow through the reactant element.

Corrugated spacer sheets 13 are disposed between each of the stiffening strips 12 and are joined at the tops 13a and bottoms 13b of the corrugations to the next-adjacent stiffening strips 12. The method of joining the spacer sheets 13 to the stiffening strips 12 is not critical and may be varied depending on the material from which the spacer sheets 13 and stiffening strips 12 are constructed and the method of manufacture of the core members. For example, these elements may be joined by an adhesive, according to a preferred embodiment, by welding, or by any other suitable technique, When thus joined, the stiffening strips 12 and spacer sheets 13 form a plurality of parallel fluid channels 14, the longitudinal axes of which extend generally in the direction A of the fluid flow through the reactant element. The upstream face B of the second core member 11 is disposed parallel and against the downstream face C of the first core member. The second core member 11 is rotationally displaced from the first core member 10 such that the stiffening strips 12 of the second core member 11 lie in planes rotationally angularly displaced from the planes of the stiffening strips in the first core member 10, generally indicated by the angle $\alpha$. As shown in FIG. 1, the angle $\alpha$ is 90°. However, as will be apparent to those skilled in the art, the magnitude of the angle $\alpha$ may vary considerably without materially affecting the ability of the reactant element to resist deflection by the moving fluid. As will also be apparent, more than two core members may be included to form the reactant element. For example, four core members can be arranged in series in the manner generally indicated in FIG. 1 with the stiffening strips of the core members arranged at approximately 45° angles to each other.

As shown in FIG. 2, the reactant element contains the particulate reactant 21 disposed in and substantially filling the fluid channels 14 of the core members 10 and 11. A fluid-permeable sheet member 20 is affixed to the upstream face 23 and the downstream face 24 of the core member assembly to retain the particulate reactant 21 within the fluid channels 14. A suitable frame 22 formed, for example, of sheet metal, extruded plastic, heavy cardboard, or the like, encloses the periphery of the core member - porous sheet assembly to form a unitary cartridge element.

From the foregoing description, it will be apparent that reactant elements constructed as disclosed herein have improved resistance to deflection because the planar stiffening strips of the core members are angularly displaced such that one set of stiffening strips resists deflection in one direction and the other sets resist deflection in another direction.

Having described my invention and the presently preferred embodiments thereof, I claim:

1. An improved cartridge element for fluid treating apparatus, specially adapted to resist deflection by fluid moving therethrough, said element comprising:
   a. a first core member, including
      i. a plurality of spaced parallel transverse planar stiffening strips disposed in planes generally parallel to the direction of fluid flow, and
      ii. corrugated spacer sheets disposed between and joined at the tops and bottoms of corrugations thereof to adjacent stiffening strips, forming a plurality of parallel fluid channels extending generally in the direction of fluid flow;
   b. a second identical core member disposed in parallel relation to said first core member and rotationally angularly displaced therefrom to the stiffening strips of said second core member lying in planes rotationally angularly displaced from the planes of the stiffening strips of said first core member;
   c. solid particulate material disposed in and substantially filling said fluid channels;
   d. porous sheet means disposed against the upstream and downstream faces of said elements covering the upstream and downstream openings of said parallel fluid channcels to retain the solid particulate material therein; and
   e. frame means enclosing the periphery of said core members and sheet means forming a unitary cartridge element.

* * * * *